(12) United States Patent
Yamashita

(10) Patent No.: US 10,001,361 B2
(45) Date of Patent: Jun. 19, 2018

(54) INCLINATION DETECTOR AND ONBOARD APPARATUS

(75) Inventor: Toshiyuki Yamashita, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 805 days.

(21) Appl. No.: 14/395,771

(22) PCT Filed: Aug. 1, 2012

(86) PCT No.: PCT/JP2012/004891
§ 371 (c)(1),
(2), (4) Date: Oct. 20, 2014

(87) PCT Pub. No.: WO2014/020647
PCT Pub. Date: Feb. 6, 2014

(65) Prior Publication Data
US 2015/0088455 A1 Mar. 26, 2015

(51) Int. Cl.
*G01B 7/30* (2006.01)
*G01C 9/08* (2006.01)
(Continued)

(52) U.S. Cl.
CPC .............. *G01B 7/30* (2013.01); *G01C 9/08* (2013.01); *G01P 15/14* (2013.01); *G01P 15/16* (2013.01)

(58) Field of Classification Search
CPC .. G01C 21/10; G01C 9/08; G01B 7/30; G01P 15/14; G01P 15/16; B60T 8/172;
(Continued)

(56) References Cited

U.S. PATENT DOCUMENTS

| 6,115,668 A | 9/2000 | Kaneko et al. |
| 2003/0130778 A1 | 7/2003 | Hrovat et al. |

(Continued)

FOREIGN PATENT DOCUMENTS

| DE | 10 2005 003 292 A1 | 11/2005 |
| DE | 10 2008 026 370 A1 | 3/2009 |

(Continued)

OTHER PUBLICATIONS

Massel et al., Investigation of different techniques for determining the road uphill gradient and the pitch angle of vehicles, Proceeding of the 2004 American Control Conference, Jan. 24, 2005.*

(Continued)

*Primary Examiner* — Kyle R Quigley
(74) *Attorney, Agent, or Firm* — Birch, Stewart, Kolasch & Birch, LLP

(57) ABSTRACT

A real acceleration computing unit 3 calculates the real acceleration Gw in the direction of travel of a vehicle by acquiring the velocity V a wheel speed sensor 12 installed in the vehicle detects. A road surface gradient computing unit 5 calculates the inclination of a road surface (road surface gradient θ1) from the real acceleration Gw and the accelerations Gx and Gz in the back and forth and up and down directions of the vehicle an acceleration sensor 11 installed in the vehicle detects. A pitching angle computing unit 6 calculates the inclination of the vehicle with respect to the road surface (pitching angle θ2) from the real acceleration Gw and the accelerations Gx and Gz.

8 Claims, 7 Drawing Sheets

(51) Int. Cl.
    *G01P 15/14* (2013.01)
    *G01P 15/16* (2013.01)
(58) Field of Classification Search
    CPC ....... B60W 2520/10; B60W 2520/105; B60W 2520/14; B60W 2520/16; B60W 2550/142; B60W 40/11; B60W 40/112; B60W 40/114; B60W 40/076
    See application file for complete search history.

(56) References Cited

U.S. PATENT DOCUMENTS

| | | | |
|---|---|---|---|
| 2007/0173984 A1* | 7/2007 | Nakayama | B60T 7/12 701/1 |
| 2007/0208524 A1 | 9/2007 | Niepelt et al. | |
| 2008/0306687 A1 | 12/2008 | Ryu et al. | |
| 2009/0309793 A1 | 12/2009 | Loomis | |
| 2009/0326858 A1 | 12/2009 | Ueda et al. | |
| 2011/0202225 A1* | 8/2011 | Willis | G01C 21/165 701/31.4 |

FOREIGN PATENT DOCUMENTS

| | | |
|---|---|---|
| DE | 11 2009 001 322 T5 | 5/2011 |
| JP | 1-267463 A | 10/1989 |
| JP | 10-253352 A | 9/1998 |
| JP | 11-192886 A | 7/1999 |
| JP | 2002-243494 A | 8/2002 |
| JP | 2003-97945 A | 8/2002 |
| JP | 2005-189101 A | 7/2005 |
| JP | 2006-47156 A | 2/2006 |
| JP | 2006-300588 A | 11/2006 |
| JP | 2006-337196 A | 12/2006 |
| JP | 2008-185418 A | 8/2008 |
| JP | 2009-282022 A | 12/2009 |

OTHER PUBLICATIONS

German Office Action dated Mar. 3, 2017 in corresponding German Patent Application No. 11 2012 006 760.6 with a partial English translation.

* cited by examiner $Gx = Gw - g \sin\theta_1$
$Gz = -g \cos\theta_1$ $Gx = Gw \cos\theta_2 - g \sin(\theta_1 + \theta_2)$
$Gz = -Gw \sin\theta_2 - g \cos(\theta_1 + \theta_2)$

INCLINATION DETECTOR AND ONBOARD APPARATUS

TECHNICAL FIELD

The present invention relates to an inclination detector that detects one of or both of the inclination of a road surface (road surface gradient) and the inclination of a vehicle with respect to the road surface (pitching angle), and to an onboard apparatus using the inclination detector.

BACKGROUND ART

A pitching angle is used by an autolevelizer system that adjusts the optical axis of headlights of a vehicle or the like. Conventionally, there is a method of calculating the pitching angle by obtaining the heights of the front wheels and rear wheels by measuring the angle of the suspension arms (see Patent Document 1, for example), or a method of calculating the pitching angle by receiving radio waves reflected off the road surface at a plurality of places of a vehicle and by using phase differences between the radio waves received (see Patent Document 2, for example).

The road surface gradient is used by a car navigation system and the like for correcting an error produced in the vehicle turning angle a gyro detects during driving on a hill. Conventionally, the road surface gradient is estimated from the acceleration occurring in the vehicle, which is detected with a single axis acceleration sensor, the acceleration in the direction of travel of the vehicle obtained from the wheel speed, and prescribed vehicle specifications (the vehicle weight, a spring constant of the suspension and the like) (see Patent Document 3, for example).

PRIOR ART DOCUMENTS

Patent Documents

Patent Document 1: Japanese Patent Laid-Open No. 11-192886.
Patent Document 2: Japanese Patent Laid-Open No. 2005-189101.
Patent Document 3: Japanese Patent Laid-Open No. 2003-97945.

DISCLOSURE OF THE INVENTION

Problems to be Solved by the Invention

It is necessary for the detection methods of the pitching angle disclosed in the Patent Documents 1 and 2 to install detectors such as expensive wheel position sensors and radio wave transmitter-receivers at a plurality of places of the vehicle. Accordingly, there are problems in that the installation layout of the detectors are restricted in accordance with the shape and the like of the vehicle, and that the cost of the components increases because of installation at the plurality of places. In addition, since the pitching angle is calculated using the difference between the detected values of the detectors and using the installation position information of the detectors, it is necessary to set the installation position of the detectors for each vehicle, which presents a problem of making it difficult for each vehicle to use the components in common.

In addition, as for the detection method of the road surface gradient of the foregoing Patent Document 3, since it uses a pitching angle set as a constant based on the vehicle specifications in order to separate the inclination of the vehicle into the inclination of the vehicle with respect to the road surface (pitching angle) and the inclination of the road surface (road surface gradient), it must set the vehicle specifications for each vehicle, which presents a problem of making it difficult for each vehicle to use the components in common. In addition, because of parts wear and parts replacement of a tire or the like, real vehicle specifications can vary from the initial vehicle specifications, which presents a problem of causing an error in the estimates of the road surface gradient.

Furthermore, if difference in a payload of a cargo occurs in a truck, or difference in the number of passengers occurs in a car, the pitching angle can vary even on a flat road, which offers a problem of being unable to take these factors into account.

The present invention is implemented to solve the foregoing problems. Therefore it is an object of the present invention to provide an inclination detector capable of utilizing the values detected with the sensors installed in the vehicle and capable of being used in common by vehicles, and to provide an onboard apparatus using the inclination detector.

Means for Solving the Problems

An inclination detector in accordance with the present invention is a device that calculates one of or both of a road surface gradient and a pitching angle from acceleration in back and forth direction and acceleration in up and down direction of a vehicle and from real acceleration in direction of travel of the vehicle, the road surface gradient being an inclination in back and forth direction of a road surface on which the vehicle is placed, and the pitching angle being an inclination in the back and forth direction of the vehicle with respect to the road surface.

An onboard apparatus in accordance with the present invention is an apparatus that operates on the basis of one of or both of the road surface gradient and the pitching angle the foregoing inclination detector calculates.

Advantages of the Invention

According to the present invention, it calculates the road surface gradient and the pitching angle from the acceleration in the back and forth direction and the acceleration in the up and down direction of the vehicle and from the real acceleration in the direction of travel of the vehicle. Accordingly, it can utilize the values detected with the sensors installed in the vehicle. As a result, it does not require any dedicated detectors to be installed in the vehicle. In addition, since it does not need the vehicle specifications, the inclination detector can be used in common by vehicles.

BEST MODE FOR CARRYING OUT THE INVENTION

The best mode for carrying out the invention will now be described with reference to the accompanying drawings to explain the present invention in more detail.

Embodiment 1

Figure 1:
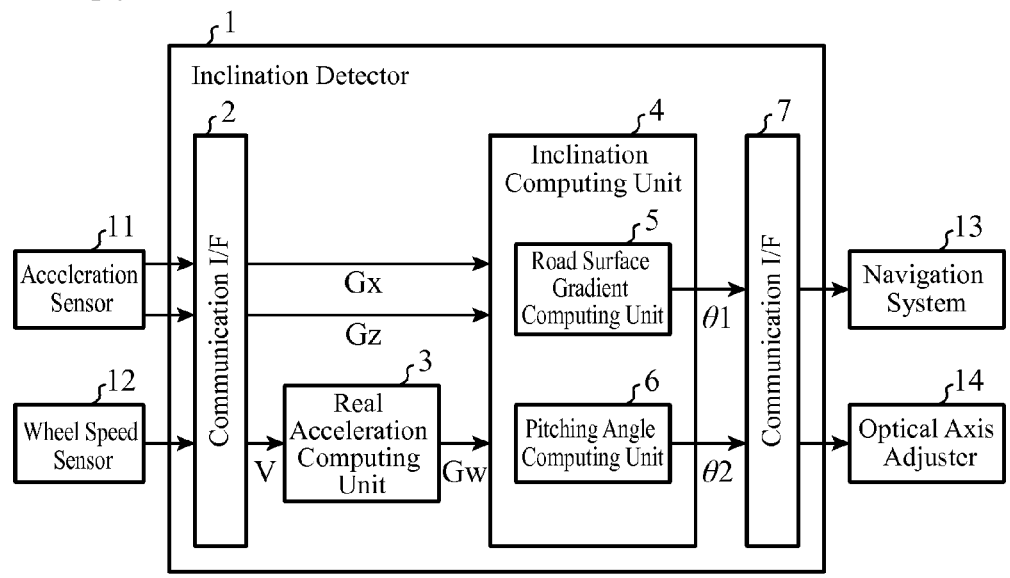
FIG. 1 is a block diagram showing a configuration of an inclination detector of an embodiment 1 in accordance with the present invention.

The inclination detector 1 shown in FIG. 1 is mounted in a vehicle to detect the inclination of a road surface (road surface gradient) in the back and forth direction of the vehicle which is placed on the road, and the inclination of the vehicle in the back and forth direction (pitching angle) with respect to the road surface.

The vehicle has a two-axis acceleration sensor 11 and a wheel speed sensor 12 installed in the vehicle to be used by an airbag system and an ABS (Antilock Brake System). In addition, the vehicle has a navigation system 13 and an optical axis adjuster 14 (the so-called autolevelizer system) mounted therein. The inclination detector 1 carries out communication with these sensors and onboard apparatuses via a vehicle communication network such as a CAN (Controller Area Network) or a LIN (Local Inter-connect Network).

Figure 2:
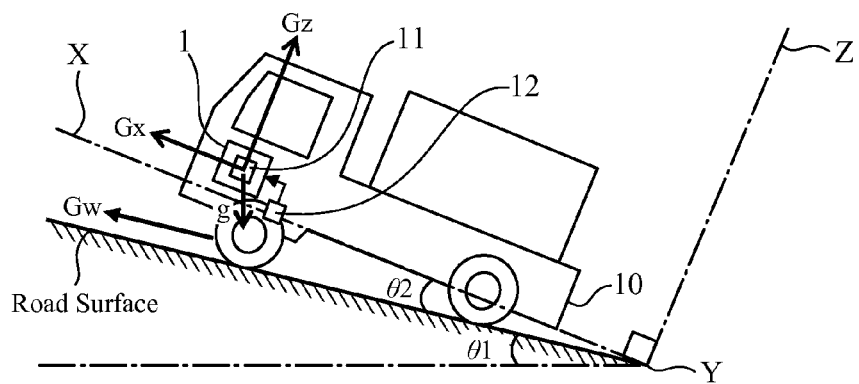
FIG. 2 is a diagram illustrating an installation state of various sensors in a vehicle, which the inclination detector of the embodiment 1 uses.

FIG. 2 is a diagram illustrating an installation state of various sensors in the vehicle, which the inclination detector 1 utilizes. It is assumed in FIG. 2 that the back and forth direction of the vehicle 10 is X axis, the right and left direction is Y axis, and the up and down direction is Z axis. The three axes are perpendicular to each other.

The two-axis acceleration sensor 11 is installed at a portion above the suspension (not shown) of the vehicle 10. The acceleration sensor 11 is disposed in such a manner that the two axes are parallel to an XZ plane so that a first axis is directed toward the direction parallel to the X axis to detect the acceleration Gx in the back and forth direction of the vehicle 10, and a second axis is directed toward the direction parallel to the Z axis to detect the acceleration Gz in the up and down direction of the vehicle 10. The accelerations Gx and Gz detected are delivered from the acceleration sensor 11 to the inclination detector 1 via the vehicle communication network.

Incidentally, in the example of FIG. 2, the inclination detector 1 and the acceleration sensor 11 are installed at the same place to reduce the time of installation and wiring.

The wheel speed sensor 12 is installed on a front wheel or rear wheel below the suspension of the vehicle 10. The wheel speed sensor 12 detects the rotation speed of the wheel, and calculates the velocity V of the vehicle 10 in the direction of travel. The calculated velocity V is transmitted from the wheel speed sensor 12 to the inclination detector 1 via the vehicle communication network.

The inclination detector 1, which is an ECU (Electric Control Unit) comprising a microcomputer (called micro from now on) and the like, comprises a communication interface (called "I/F" from now on) 2 that communicates with the acceleration sensor 11 and wheel speed sensor 12 via the vehicle communication network; a communication I/F 7 that communicates with the navigation system 13 and optical axis adjuster 14 via the vehicle communication network; a real acceleration computing unit 3; and an inclination computing unit 4. The real acceleration computing unit 3 obtains a time derivative of the velocity V transmitted from the wheel speed sensor 12, and calculates the acceleration of the vehicle 10 in the direction of travel, that is, the real acceleration Gw.

The inclination computing unit 4 comprises a road surface gradient computing unit 5 that calculates the inclination (road surface gradient θ1) in the back and forth direction of a road surface on which the vehicle 10 is placed, and a pitching angle computing unit 6 that calculates the inclination (pitching angle θ2) in the back and forth direction of the vehicle 10 with respect to the road surface. The inclination computing unit 4 calculates the road surface gradient θ1 and pitching angle θ2 from the accelerations Gx and Gz transmitted from the acceleration sensor 11 and the real acceleration Gw the real acceleration computing unit 3 calculates, and outputs them as inclination information.

The road surface gradient θ1 is transmitted to the navigation system 13 via the communication I/F 7, and is used for vehicle position correction and the like. The pitching angle θ2 is transmitted to the optical axis adjuster 14 via the communication I/F 7, and is used for the control of maintaining the optical axis of the headlights at a fixed angle with respect to the road surface.

Incidentally, as for the processing of the navigation system 13 based on the road surface gradient θ1 and as for the processing of the optical axis adjuster 14 based on the pitching angle θ2, since they are publicly known technique, their detailed description will be omitted.

Next, the computing principle of the inclination computing unit 4 will be described.

Figure 3:
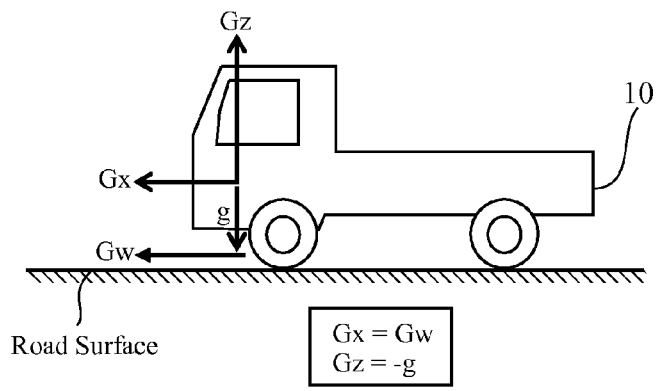
FIG. 3 is a schematic diagram showing a state in which a road surface is flat and the vehicle has no inclination with respect to the road surface.

FIG. 3 is a schematic diagram showing a state in which the road surface is flat, and the vehicle 10 has no inclination with respect to the road surface. In this case, the acceleration Gx in the back and forth direction of the vehicle 10 is equal to the real acceleration Gw in the direction of travel of the vehicle 10 (Expression 1). In addition, the acceleration Gz in the up and down direction of the vehicle 10 is equal to gravitational acceleration −g (Expression 2).

$$Gx = Gw \quad (1)$$

$$Gz = -g \quad (2)$$

Figure 4:
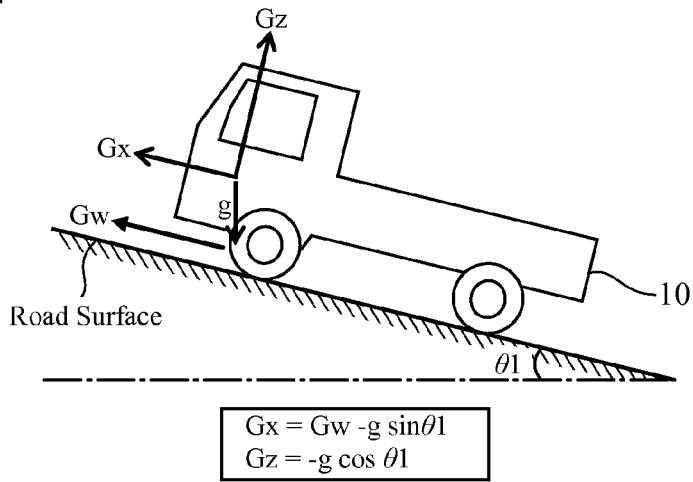
FIG. 4 is a schematic diagram showing a state in which a road surface inclines and the vehicle has an inclination with respect to the road surface.

FIG. 4 is a schematic diagram showing a state in which the road surface slopes such as a hill, but the vehicle 10 has no inclination with respect to the road surface. In this case, the acceleration Gx in the back and forth direction of the vehicle 10 is detected by subtracting the gravitational acceleration component g sin θ1 from the real acceleration Gw in the direction of travel of the vehicle 10 (Expression 3). In addition, the acceleration Gz in the up and down direction of the vehicle 10 equals the gravitational acceleration −g cos θ1 (Expression 4).

$$Gx = Gw - g\sin\theta_1 \quad (3)$$

$$Gz = -g\cos\theta_1 \quad (4)$$

Figure 5:
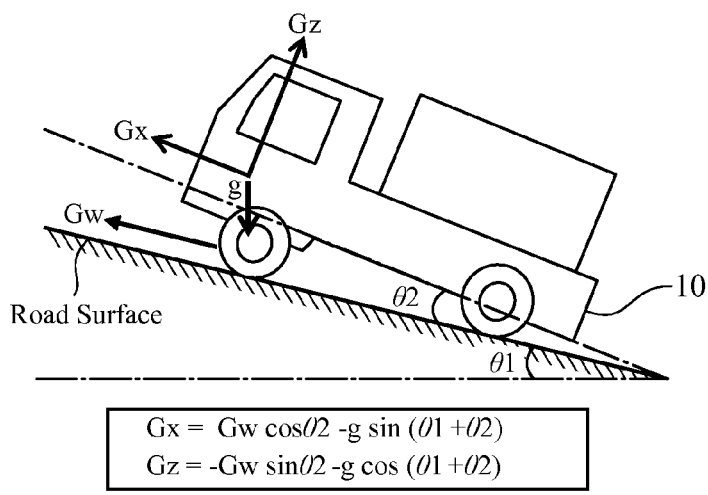
FIG. 5 shows an inclination detector 1 illustrating a state in which the road surface inclines and the vehicle also inclines with respect to the road surface.

FIG. 5 is a schematic diagram showing a state in which the road surface slopes such as a hill, and the vehicle 10 also slopes with respect to the road surface. The vehicle 10 has displacement of its suspension between the front wheels and rear wheels because of a load on its bed, and slopes in the back and forth direction as the result. In this case, the direction of the acceleration Gx in the back and forth direction of the vehicle 10 differs from the direction of the real acceleration Gw in the direction of travel of the vehicle 10 by the pitching angle θ2 of the vehicle (Expression 5). In addition, as for the acceleration Gz in the up and down direction of the vehicle 10, the sine component of the real acceleration Gw in the direction of travel of the vehicle 10 is superposed (Expression 6).

$$Gx = Gw\cos\theta_2 - g\sin(\theta_1 + \theta_2) \quad (5)$$

$$Gz = -Gw\sin\theta_2 - g\cos(\theta_1 + \theta_2) \quad (6)$$

Since the pitching angle computing unit 6 of the inclination computing unit 4 receives the accelerations Gx, Gz and Gw, it can calculate the road surface gradient θ1 and the pitching angle θ2 of the vehicle 10 from the foregoing Expressions (5) and (6).

A concrete deriving method of the pitching angle θ2 is as follows.

First, by rewriting the following Expression (7) derived from the foregoing Expressions (5) and (6), the following Expression (8) is obtained. After that, the following Expression (8) is changed as to the pitching angle θ2 to obtain the following Expression (9).

$$(Gx - Gw\cos\theta_2)^2 + (Gz + Gw\sin\theta_2)^2 = g^2 \quad (7)$$

$$(Gx^2 + Gz^2 + Gw^2 - g^2)/2Gw = Gx\cos\theta_2 - Gz\sin\theta_2 \quad (8)$$

$$\theta_2 = \tan^{-1}(Gx/Gz) + \sin^{-1}\{(Gx^2 + Gz^2 + Gw^2 - g^2)/2Gw/\operatorname{sqrt}(Gx^2 + Gz^2)\} \quad (9)$$

where sqrt(x) is a function for obtaining a square root of x.

The pitching angle computing unit 6 can calculate accurate pitching angle θ2 by calculating θ2 according to the foregoing Expression (9).

However, since Expression (9) includes complicated inverse functions such as $\tan^{-1}$ and $\sin^{-1}$, it is necessary to use a high-performance micro.

Here, another computing method will be described. In the following, it approximates the complicated functions to reduce the computing processing.

Utilizing the fact that a region of the pitching angle θ2 is near zero degree (θ2<<1), the foregoing Expression (9) is reduced to the following approximate Expression (10) or (11) by substituting sin θ2≈θ2 and cos θ2≈1. The pitching angle computing unit 6 can calculate the pitching angle θ2 by calculating the following Expression (10) or Expression (11).

$$\theta_2 = -\{(Gx - Gw)^2 + Gz^2 - g^2\}/2GwGz \quad (10)$$

$$\theta_2 = [-\operatorname{sqrt}\{g^2 - (Gx - Gw)^2\} - Gz]/Gw \quad (11)$$

Figure 6:
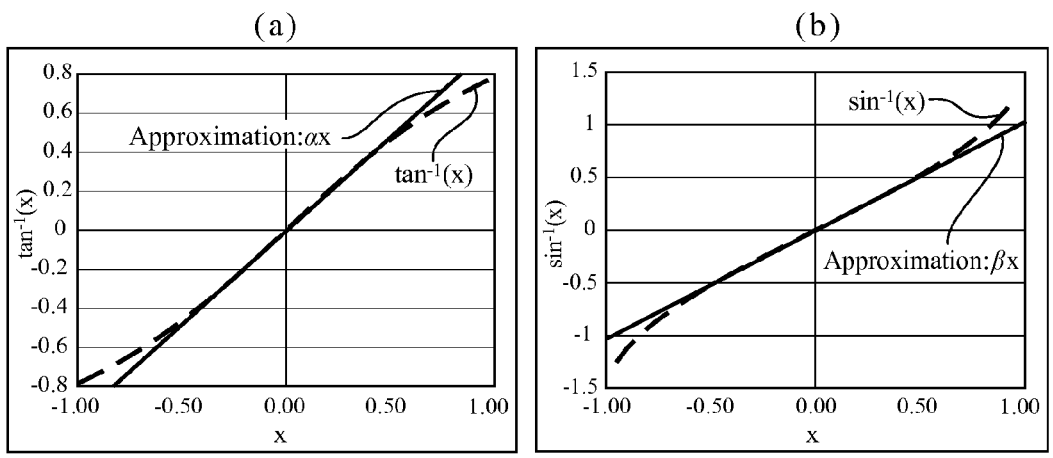
FIG. 6(a) is a graph showing linear approximate Expression ax of $\tan^{-1}$ (x)
FIG. 6(b) is a graph showing linear approximate Expression βx of $\sin^{-1}$ (x)

Alternatively, $\tan^{-1}$ and $\sin^{-1}$ of the foregoing Expression (9) is subjected to a linear approximation, and the following coefficients α and β are obtained in such a manner as to reduce the approximate error in advance. FIG. 6(a) is a graph showing a linear approximate Expression αx of $\tan^{-1}$(x). FIG. 6(b) is a graph showing a linear approximate Expression βx of $\sin^{-1}$(x). As shown in the graphs, the linear approximation is possible in the neighborhood of the zero point. Accordingly, an approximation such as the following Expression (12) is possible using the coefficients α and β.

$$\theta_2 = \alpha(Gx/Gz) + \beta\{(Gx^2 + Gz^2 + Gw^2 - g^2)/2Gw/\operatorname{sqrt}(Gx^2 + Gz^2)\} \quad (12)$$

In this case, setting the coefficients α and β which are obtained in advance in the pitching angle computing unit 6 enables the pitching angle computing unit 6 to calculate the pitching angle θ according to the foregoing Expression (12) using the coefficients α and β.

As described above, using one of the approximate Expressions (10)-(12) makes it unnecessary to calculate a complicated function such as $\tan^{-1}$ and $\sin^{-1}$, and hence an inexpensive micro is enough to calculate it.

Next, derivation of the road surface gradient θ1 will be described.

First, the following Expression (13) is obtained by squaring both sides of the foregoing Expressions (5) and (6), followed by adding and rearranging. After that, reducing the following Expression (13) according to the addition formula results in the following Expression (14). Rearranging it as to the road surface gradient θ1 yields the following Expression (15).

$$Gx^2 + Gz^2 = Gw^2 + g^2 - 2Gw\, g\{\cos\theta_2\sin(\theta_1 + \theta_2) - \sin\theta_2\cos(\theta_1 + \theta_2)\} \quad (13)$$

$$Gx^2 + Gz^2 = Gw^2 + g^2 - 2Gw\, g\sin\theta_1 \quad (14)$$

$$\theta_1 = \sin^{-1}\{(-Gx^2 - Gz^2 + Gw^2 + g^2)/2Gw\, g\} \quad (15)$$

The road surface gradient computing unit 5 can calculate the accurate road surface gradient θ1 by calculating θ1 according to the foregoing Expression (15).

However, since Expression (15) includes a complicated function such as $\sin^{-1}$, it is necessary for its calculation to use a high-performance micro.

Here, another computing method will be described. As in the calculation of the pitching angle θ2, the computing processing is reduced by approximating the complicated function in the Expression of the road surface gradient θ1.

Utilizing the fact that the road surface gradient θ1 varies in a region close to zero degree (θ1<<1), the foregoing Expression (15) is reduced to the following approximate Expression (16) by substituting sin θ1≈θ1. The road surface gradient computing unit 5 can calculate the road surface gradient θ1 according to the following Expression (16).

$$\theta_1 = (-Gx^2 - Gz^2 + Gw^2 + g^2)/2Gwg \quad (16)$$

Alternatively, the approximation given by the following Expression (17) is possible by linearly approximating $\sin^{-1}$ in the foregoing Expression (15) by obtaining such a coefficient γ in advance that will reduce the approximated error.

$$\theta1=\gamma(-Gx^2-Gz^2+Gw^2+g^2)/2Gwg \quad (17)$$

In this case, setting the coefficient γ, which is obtained in advance, in the road surface gradient computing unit 5 enables the road surface gradient computing unit 5 to calculate the road surface gradient θ1 according to the foregoing Expression (17) using the coefficient γ.

Using the foregoing approximate Expression (16) or (17) makes it unnecessary to calculate the complicated function such as $\sin^{-1}$, and hence an inexpensive micro is enough to calculate it.

Incidentally, although an example is described of computing the inclination when the road surface gradient θ1 and the pitching angle θ2 are positive from FIG. 2 to FIG. 5, when they are negative, the inclination can be calculated in the same manner.

As described above, according to the embodiment 1, it is configured in such a manner that the inclination computing unit 4 of the inclination detector 1 comprises the road surface gradient computing unit 5 that calculates the road surface gradient θ1 from the acceleration Gx in the back and forth direction of the vehicle 10, the acceleration Gz in the up and down direction and the real acceleration Gw in the direction of travel; and the pitching angle computing unit 6 that calculates the pitching angle θ2 from the accelerations Gx and Gz and the real acceleration Gw. As a result, it can calculate the road surface gradient θ1 and the pitching angle θ2 by using the values detected by the two-axis acceleration sensor 11 and the wheel speed sensor 12 which are installed in the vehicle 10 from the beginning, thereby making it unnecessary to use an expensive detector such as the sensors that detect the position of the wheels and a device that transmits and receives a radio wave. In addition, it is also unnecessary to install a plurality of detectors at a plurality of places of the vehicle 10. Furthermore, since it is unnecessary to refer to the vehicle specifications as the conventional apparatuses, it can use the inclination detector 1 in common among vehicles. Accordingly, it can utilize the detected values of the sensors installed in the vehicle 10, and offer the inclination detector 1 that can be used in common among vehicles.

In addition, according to the embodiment 1, the inclination detector 1 is configured in such a manner as to comprise the communication I/F 2 that acquires the velocity V in the direction of travel from the wheel speed sensor 12 installed in the vehicle 10, and the real acceleration computing unit 3 that calculates the real acceleration Gw in the direction of travel by differentiating the velocity V acquired via the communication I/F 2. As a result, it can apply the detected values of the wheel speed sensor 12 which are used in the ABS or the like, and obviate the necessity for installing a new sensor for detecting the real acceleration Gw.

In addition, according to the embodiment 1, the inclination detector 1 is configured in such a manner as to comprise the communication I/F 2 that acquires the acceleration Gx in the back and forth direction and the acceleration Gz in the up and down direction of the vehicle from the two-axis acceleration sensor 11 that has its first axis installed in the vehicle 10 in such a manner as to be parallel to the back and forth direction of the vehicle 10 and its second axis in such a manner as to be parallel to the up and down direction of the vehicle. As a result, it can utilize the detected values of the acceleration sensor 11 used by an air bag system or the like, and obviate the necessity for installing any new additional sensor for detecting the accelerations Gx and Gz. In addition, limiting the mounting direction of the acceleration sensor 11 enables the inclination computing unit 4 to utilize the detected accelerations without converting them. Accordingly, it can further reduce the processing load of the inclination detector 1, which enables it to use a more inexpensive micro.

In addition, according to the embodiment 1, the road surface gradient computing unit 5 and the pitching angle computing unit 6 of the inclination computing unit 4 are configured in such a manner as to calculate or approximately calculate the foregoing two Expressions (5) and (6) using the acceleration Gx in the back and forth direction, the acceleration Gz in the up and down direction and the real acceleration Gw in the direction of travel, thereby calculating the road surface gradient θ1 and the pitching angle θ2. As a result, it can compute the road surface gradient θ1 and the pitching angle θ2 without referring to the vehicle specifications. Furthermore, using approximate Expressions (10)-(12), (16) and (17) derived from Expression (5) and (6) enables reducing the processing load of the inclination detector 1 and using a more inexpensive micro.

In addition, according to the embodiment 1, since the navigation system 13 is configured in such a manner as to control the vehicle position during navigation according to the road surface gradient θ1 the inclination detector 1 calculates, it can compute the accurate vehicle position.

In addition, since the optical axis adjuster 14 is configured in such a manner as to control the optical axis of the headlights of the vehicle 10 in accordance with the pitching angle θ2 the inclination detector 1 calculates, it can adjust it at an angle at which an oncoming car is not dazzled by the headlights.

Embodiment 2

Figure 7:
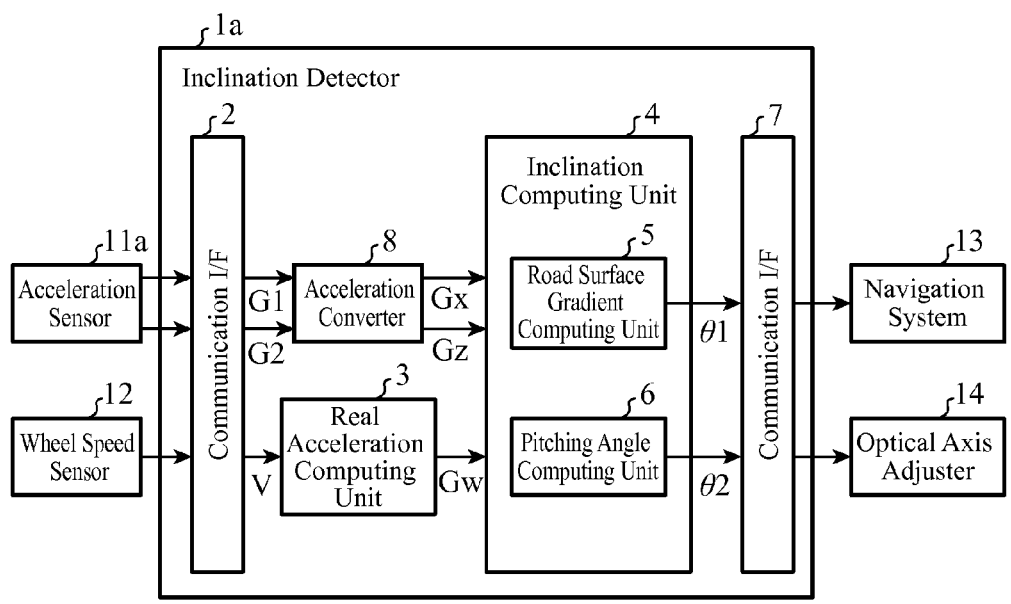
FIG. 7 is a block diagram showing a configuration of an inclination detector of an embodiment 2 in accordance with the present invention.
Figure 8:
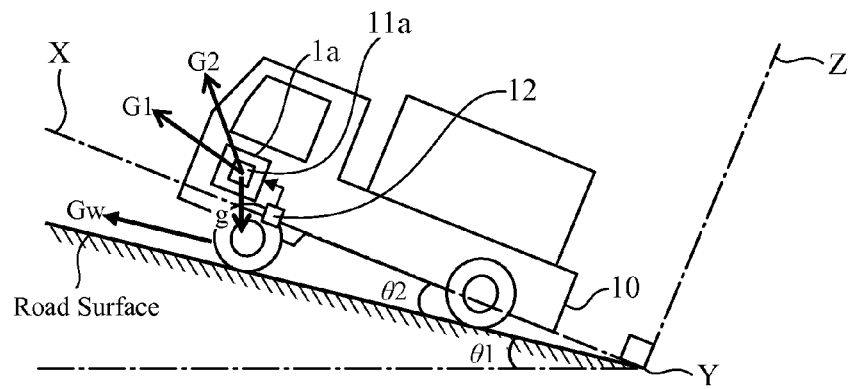
FIG. 8 is a diagram illustrating an installation state of various sensors in a vehicle, which the inclination detector of the embodiment 2 uses.

FIG. 7 is a block diagram showing a configuration of an inclination detector 1a of the present embodiment 2. FIG. 8 is a diagram illustrating an installation state of various sensors in a vehicle, which the inclination detector 1a utilizes. In FIG. 7 and FIG. 8, the same or like components to those of FIG. 1-FIG. 7 are designated by the same reference numerals and their description will be omitted.

Although the foregoing embodiment 1 employs the two-axis acceleration sensor 11 installed in the vehicle 10 to detect the acceleration Gx in the back and forth direction and the acceleration Gz in the up and down direction of the vehicle 10, the present embodiment 2 employs a two-axis acceleration sensor 11a that detects accelerations G1 and G2 of any two directions. In addition, the inclination detector 1a has an additional acceleration converter 8 that converts the accelerations G1 and G2 the acceleration sensor 11a detects to the accelerations Gx and Gz.

The acceleration converter 8 has mounting information in advance indicating the directions in which the two axes of the acceleration sensor 11a are installed with respect to the vehicle 10. Using the mounting information, the acceleration converter 8 converts the accelerations G1 and G2 the acceleration sensor 11a detects to the acceleration Gx in the back and forth direction and the acceleration Gz in the up and down direction of the vehicle 10. As for the converting method of the acceleration, since it is a publicly known technique, the detailed description thereof will be omitted.

Here, the mounting conditions of the acceleration sensor 11a will be described.

Figure 9:
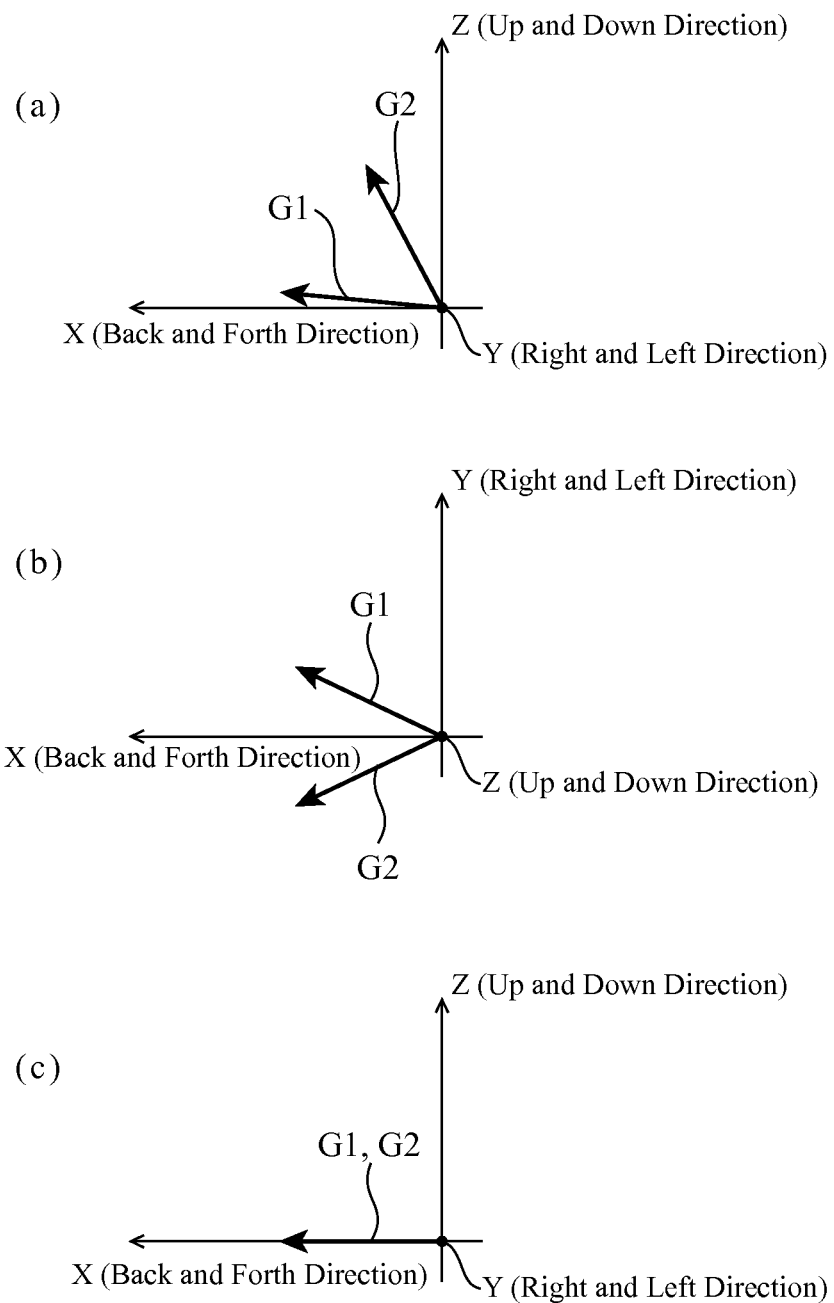
FIG. 9 is a diagram illustrating orientation of two axes of an acceleration sensor with respect to the XYZ axes of a vehicle.

FIG. 9 is a diagram illustrating the directions of the two axes of the acceleration sensor 11a with respect to the virtual XYZ axes of the vehicle 10: FIG. 9 (a) and FIG. 9 (c) are an XZ-plane view; and FIG. 9 (b) is an XY-plane view.

As shown in FIG. 9 (a) and FIG. 9 (b), the directions of the two axes for detecting the accelerations G1 and G2 can be orientated to a state tilting by any angle with respect to the X axis, Y axis and Z axis.

However, if the two axes of the accelerations G1 and G2 are both orientated parallel to the XY plane (horizontal plane passing through the back and forth direction of the vehicle 10 and the right and left direction) as shown in FIG. 9(c), the acceleration converter 8 cannot compute the acceleration Gz in the up and down direction of the vehicle 10. Likewise, although not shown in a drawing, if the two axes are both oriented parallel to the YZ plane (the vertical plane passing through the right and left direction and the up and down direction), the acceleration converter 8 cannot compute the acceleration Gx in the back and forth direction of the vehicle 10. Accordingly, it is necessary for at least one axis to have a tilt against the XY plane and YZ plane.

The processing after that is the same as that of the foregoing embodiment 1. Thus, the inclination computing unit 4 calculates the road surface gradient θ1 and the pitching angle θ2 from the accelerations Gx and Gz passing through the conversion by the acceleration converter 8 and from the real acceleration Gw in the direction of travel of the vehicle 10 calculated by the real acceleration computing unit 3, and outputs them as the inclination information.

As described above, according to the embodiment 2, the inclination detector 1a is configured in such a manner as to comprise the communication I/F 2 that acquires the accelerations G1 and G2 in any two-axis directions from the acceleration sensor 11a installed in the vehicle 10 in such a manner that at least one of its axes has a tilt with respect to the horizontal plane (XY plane) passing through the back and forth direction and the right and left direction and with respect to the vertical plane (YZ plane) passing through the right and left direction and the up and down direction; and the acceleration converter 8 that converts, using the mounting information of the acceleration sensor 11a, the accelerations G1 and G2 acquired via the communication I/F 2 into the acceleration Gx in the back and forth direction and the acceleration Gz in the up and down direction. As a result, it can ensure the degrees of freedom of the orientation of the two axis directions of the acceleration sensor 11a. Accordingly, even if the two-axis acceleration sensor installed in the vehicle 10 is not a device that detects the acceleration in the back and forth direction and the up and down direction of the vehicle, it is applicable to the inclination detector 1a.

Figure 10:
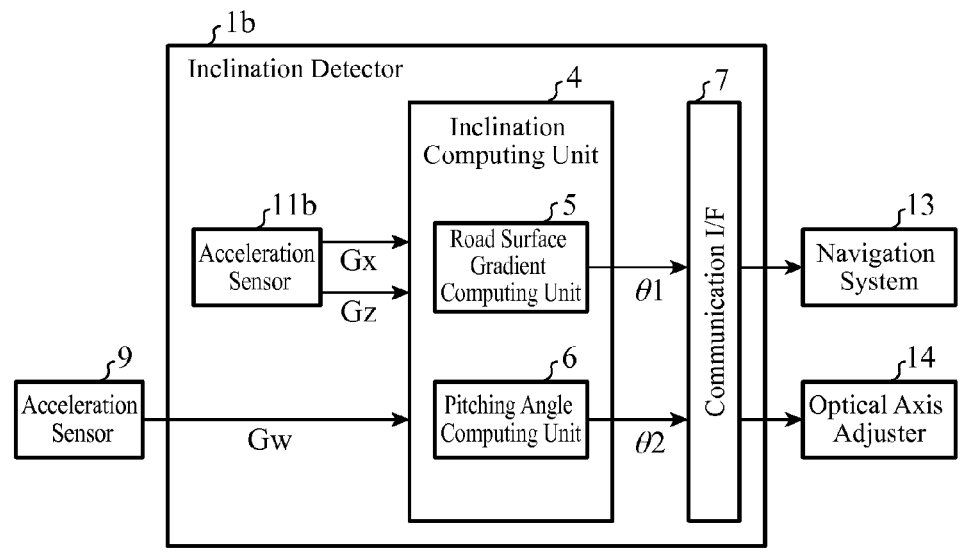
FIG. 10 is a block diagram showing a variation of the inclination detector of the embodiment 1 or 2.

Incidentally, although the foregoing embodiments 1 and 2 have a configuration in which the inclination detectors 1 and 1a utilize the acceleration sensor 11 and 11a installed in the vehicle 10 from the first, a configuration is also possible to provide the inclination detectors 1 and 1a with dedicated acceleration sensors 11 and 11a. An example of such a configuration is shown in FIG. 10. As shown in FIG. 10, the inclination detector 1b comprises a dedicated acceleration sensor 11b that supplies the accelerations Gx and Gz directly from the acceleration sensor 11b to the inclination computing unit 4 without passing through the communication I/F 2.

In addition, although the foregoing embodiments 1 and 2 have a configuration in which the inclination detectors 1 and 1a utilize the wheel speed sensor 12 installed in the vehicle 10 from the first, a configuration is also possible which detects the real acceleration Gw using an acceleration sensor 9 instead of the wheel speed sensor 12 in the same manner as the inclination detector 1b shown in FIG. 10. However, since the acceleration sensor 9 has to detect the acceleration in the direction of travel of the vehicle 10, it is installed below the suspension. The inclination detector 1b can be configured in such a manner as to receive the detected values of the acceleration sensor 9 via the vehicle communication network or the like.

The configuration obviates the necessity of the real acceleration computing unit 3.

In addition, although the foregoing embodiments 1 and 2 use a two-axis acceleration sensor as the acceleration sensor 11 and 11a, a configuration is also possible which uses a pair of one-axis acceleration sensors. It goes without saying that the configuration can achieve the same advantages.

In addition, although the foregoing embodiments 1 and 2 have a configuration in which the inclination computing unit 4 comprises both the road surface gradient computing unit 5 and pitching angle computing unit 6, a configuration is also possible which comprises one of them.

Embodiment 3

Figure 11:
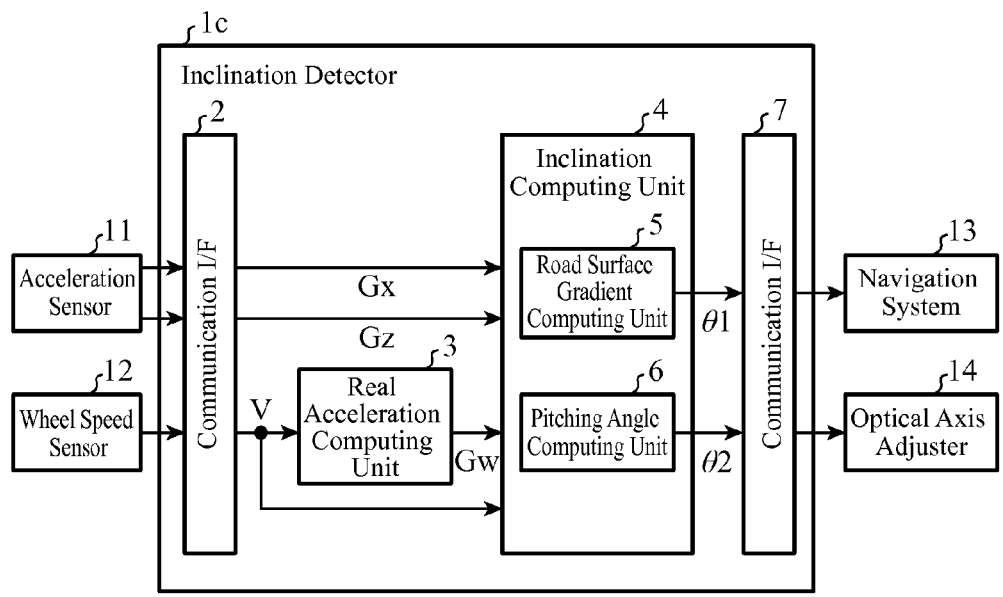
FIG. 11 is a block diagram showing a configuration of an inclination detector of an embodiment 3 in accordance with the present invention.

FIG. 11 is a block diagram showing a configuration of an inclination detector 1c of the present embodiment 3. In FIG. 11, the same or like components to those of FIG. 1-FIG. 10 are designated by the same reference numerals and their description will be omitted.

Although the computing processing of the road surface gradient θ1 and the pitching angle θ2 while the vehicle 10 is driven is described in the foregoing embodiments 1 and 2, the present embodiment 3 describes the computing processing while the vehicle 10 is stopped.

In the inclination detector 1c, the inclination computing unit 4 as well as the real acceleration computing unit 3 uses the velocity V of the vehicle 10 received from the wheel speed sensor 12. The inclination computing unit 4 decides on whether the vehicle 10 is running or stopped from the velocity V acquired from the wheel speed sensor 12 via the communication I/F 2, and executes different computing processing depending on whether it is running or stopped.

Figure 12:
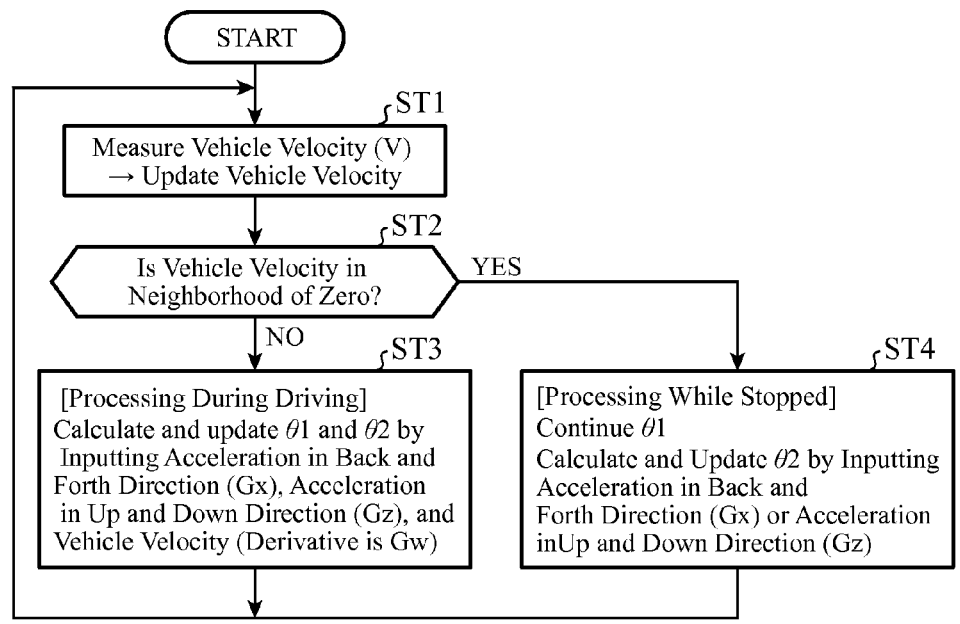
FIG. 12 is a flowchart showing the operation of the inclination detector of the embodiment 3.

FIG. 12 is a flowchart showing the operation of the inclination detector 1c of the present embodiment 3. At step ST1, the wheel speed sensor 12 measures the velocity V of the vehicle 10, and the inclination computing unit 4 acquires and updates the velocity V. At the next step ST2, the inclination computing unit 4 decides on whether the velocity V is in a neighborhood of zero or not, and if the velocity V is in the neighborhood of zero ("YES" at step ST2), it decides that the vehicle is stopped, and proceeds to step ST4. Unless the velocity V is in the neighborhood of zero ("NO" at step ST2), it decides that the vehicle is running, and proceeds to step ST3.

When the vehicle 10 is running, the road surface gradient computing unit 5 and the pitching angle computing unit 6 of the inclination computing unit 4 calculate the road surface gradient θ1 and the pitching angle θ2 at step ST3 according to the foregoing approximate Expressions as described in the foregoing embodiment 1 using the acceleration Gx in the back and forth direction and the acceleration Gz in the up and down direction of the vehicle 10, and the real acceleration Gw in the direction of travel.

While the vehicle 10 is stopped, the road surface gradient computing unit 5 of the inclination computing unit 4 supposes at step ST4 that the road surface gradient θ1 does not change, and holds the value θ1 without carrying out the computation (without change). The pitching angle computing unit 6 calculates the pitching angle θ2 according to the following Expression (18) or (19) using the acceleration Gx in the back and forth direction, the acceleration Gz in the up and down direction of the vehicle 10 and the road surface gradient θ1 held in the road surface gradient computing unit 5 in order to detect the inclination of the vehicle 10 involved in the movement of passengers or cargo handling.

$$Gx = -g\,\sin(\theta 1 + \theta 2) \qquad (18)$$

$$Gz = -g\,\cos(\theta 1 + \theta 2) \qquad (19)$$

Furthermore, the pitching angle computing unit 6 can calculate the pitching angle θ2 by computing the following Expression (20) obtained by varying the foregoing Expression (18) or the following Expression (21) obtained by varying the foregoing Expression (19). In this case, the pitching angle θ2 can be computed by approximately calculating Expression (20) or (21) by obtaining a linear approximation of $\sin^{-1}$ or $\cos^{-1}$ in advance.

$$\theta 2 = \sin^{-1}(-Gx/g) - \theta 1 \qquad (20)$$

$$\theta 2 = \cos^{-1}(-Gz/g) - \theta 1 \qquad (21)$$

As described above, according to the embodiment 3, it is configured in such a manner that the road surface gradient computing unit 5 of the inclination computing unit 4 holds the road surface gradient θ1 while the vehicle 10 is stopped, and that the pitching angle computing unit 6 calculates the pitching angle θ2 by calculating or approximately calculating one of the foregoing Expressions (18) and (19) using the acceleration Gx in the back and forth direction or the acceleration Gz in the up and down direction. As a result, it can execute the calculation of the pitching angle θ2 while the vehicle 10 is stopped. Accordingly, it can detect the inclination of the vehicle 10 involved in the movement of a passenger or cargo handling, for example.

Incidentally, in the foregoing description, although the inclination detector 1c shown in FIG. 11 is configured by modifying the inclination detector 1 of the embodiment 1 shown in FIG. 1, it can also be configured by modifying the inclination detector 1a of the embodiment 2 shown in FIG. 7.

Embodiment 4

Figure 13:
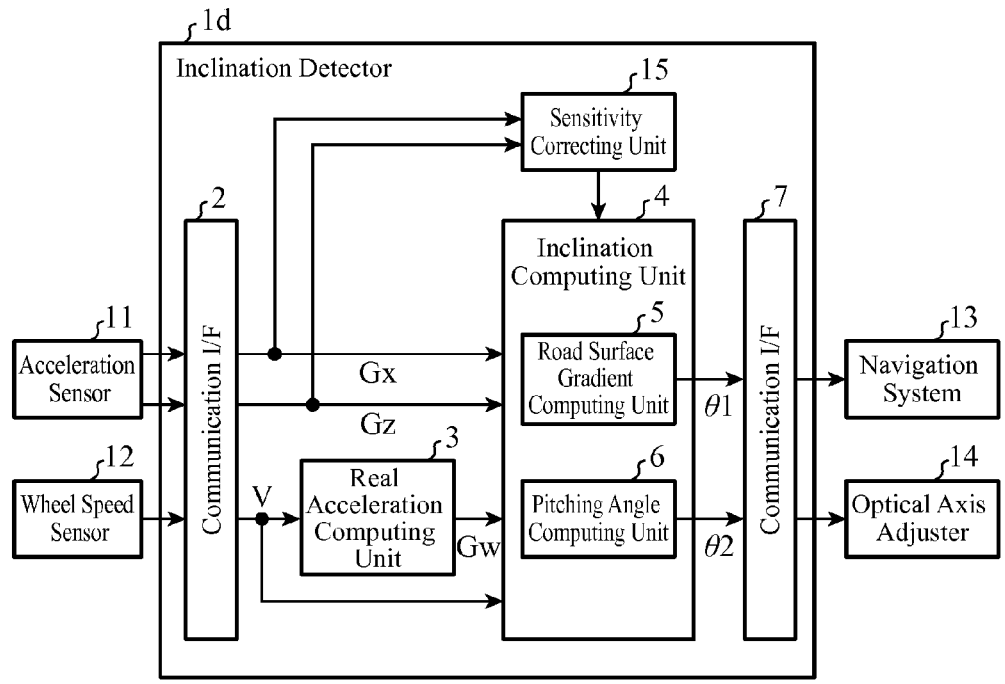
FIG. 13 is a block diagram showing a configuration of an inclination detector of an embodiment 4 in accordance with the present invention.

FIG. 13 is a block diagram showing a configuration of an inclination detector 1d of the present embodiment 4. In FIG. 13, the same or like components to those of FIG. 1-FIG. 11 are designated by the same reference numerals and their description will be omitted.

Generally, the inclination computing unit 4 amplifies the accelerations Gx and Gz the acceleration sensor 11 detects by a prescribed sensitivity (gain) and uses for the calculation of the road surface gradient θ1 and the pitching angle θ2. Thus, the present embodiment 4 has a sensitivity correcting unit 15 newly added for correcting the sensitivity of the acceleration sensor 11, and carries out the sensitivity correction of the acceleration sensor 11 while the vehicle 10 is stopped.

Figure 14:
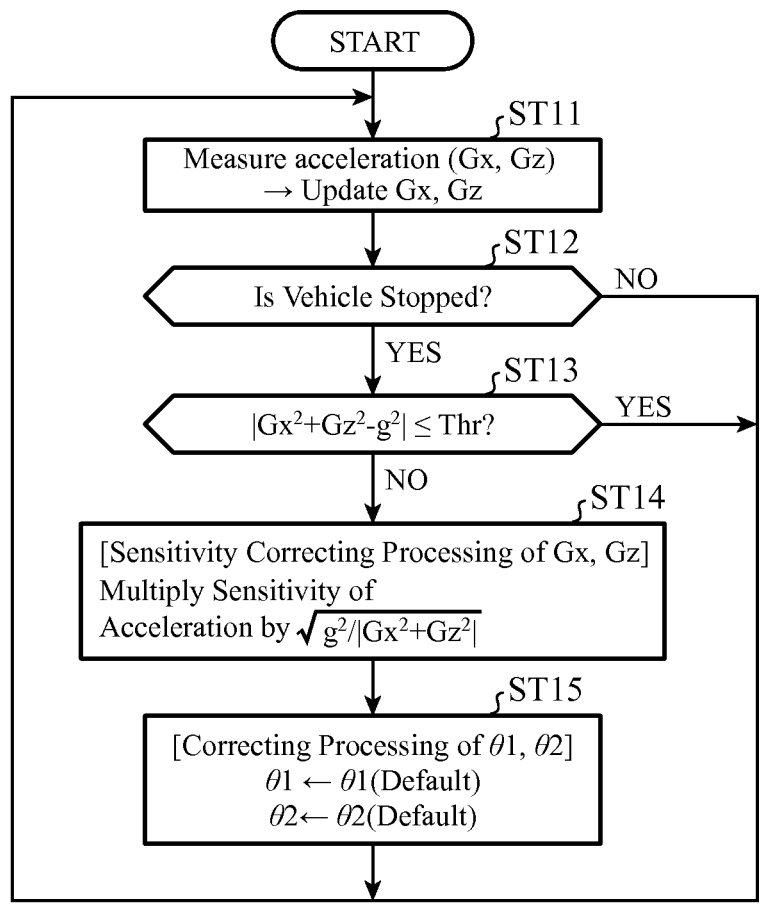
FIG. 14 is a flowchart showing the operation of the inclination detector of the embodiment 4.

FIG. 14 is a flowchart showing the operation of the inclination detector 1d of the present embodiment 4. At step ST11, the acceleration sensor 11 measures the acceleration Gx in the back and forth direction and the acceleration Gz in the up and down direction of the vehicle 10, and the inclination computing unit 4 acquires and updates the accelerations Gx and Gz. At the next step ST12, the inclination computing unit 4 decides on whether the velocity V is in a neighborhood of zero, and if it is in the neighborhood of zero, it decides that the vehicle is stopped ("YES" at step ST12). If it decides that the vehicle is stopped ("YES" at step ST12), it proceeds to step ST13.

The decision that the vehicle is stopped can be made by combining the condition that the velocity V is in the neighborhood of zero with the condition that the ignition switch is turned on just before (within several hundred milliseconds).

A concrete example will be described.

When a driver turns on the ignition switch, the inclination detector 1d is supplied with power and is started. If it is immediately after the inclination detector 1d is started, and if the velocity V is in the neighborhood of zero, the inclination computing unit 4 decides that the vehicle is stopped ("YES" at step ST12). Otherwise, it decides that the vehicle is running ("NO" at step ST12).

This makes it possible to execute the correction processing (steps ST13-ST15) which will be described below during the time period from switching on of the ignition switch by the driver of the vehicle 10 to pushing down on the accelerator, that is, at the timing at which it is more certain that the vehicle 10 is stopped, to prevent unnecessary correction processing (steps ST13-ST15) in a state in which the velocity V varies a little in the neighborhood of zero, and to execute highly accurate correction.

When the vehicle 10 is stopped, the sensitivity correcting unit 15 compares the acceleration Gx in the back and forth direction and the acceleration Gz in the up and down direction of the vehicle 10 with the gravitational acceleration g at step ST13. More specifically, when the absolute value of the vector components of the accelerations Gx and Gz differs from the gravitational acceleration g by an amount greater than a preset first threshold Thr ("NO" at step ST13), the sensitivity correcting unit 15 executes the sensitivity correction processing at step ST14.

At step ST14, the sensitivity correcting unit 15 multiplies the sensitivity of the accelerations Gx and Gz by a factor of sqrt $(g^2/(Gx^2+Gz^2))$ to carry out the sensitivity correction of the acceleration sensor 11. The inclination computing unit 4 uses the accelerations Gx and Gz which the acceleration sensor 11 detects and the sensitivity correcting unit 15 amplifies by the amount of the sensitivity of correction for calculating the road surface gradient θ1 and the pitching angle θ2.

Furthermore, if the sensitivity correcting unit 15 decides that the absolute value of the vector components of the accelerations Gx and Gz differs from the gravitational acceleration g markedly, a configuration is possible which considers that the acceleration sensor 11 has a fault and prevents the accelerations Gx and Gz the acceleration sensor 11 detects from being used. More specifically, if the absolute value of the vector components of the accelerations Gx and Gz differs from the gravitational acceleration g by an amount greater than a preset second threshold Thr1 (Thr1>Thr) (when $|Gx^2+Gz^2-g^2| \leq$ Thr1 does not hold true), the sensitivity correcting unit 15 sends information to the inclination computing unit 4, and the inclination computing unit 4 executes the processing at step ST15.

At step ST15, the road surface gradient computing unit 5 and the pitching angle computing unit 6 of the inclination computing unit 4 does not execute the computing processing of the road surface gradient θ1 and the pitching angle θ2, but outputs preset values θ1(default) and θ2(default).

As for the set values θ1(default) and θ2(default), they can be defined after making a safety analysis in advance in such a manner that apparatuses operating on the basis of the road surface gradient θ1 and the pitching angle θ2 (such as the navigation system 13 and optical axis adjuster 14) can operate safely.

As a concrete example, in the optical axis adjuster 14 that utilizes the pitching angle θ2 of the vehicle 10, the set value θ2(default) is set at a fail-safe side (lower side) so as to prevent the headlights from illuminating upward more than necessary and from dazzling an oncoming car while the vehicle is stopped.

On the other hand, if the inclination computing unit 4 decides that the vehicle is running ("NO" at step ST12) or if $|Gx^2+Gz^2-g^2| \le Thr$ holds true ("YES" at step ST13), it returns the processing to step ST11.

As described above, according to the embodiment 4, the inclination detector 1d is configured in such a manner as to comprise the sensitivity correcting unit 15 that corrects the sensitivity of the acceleration sensor 11 in accordance with the accelerations Gx and Gz and gravitational acceleration g while the vehicle 10 is stopped and when the difference $|Gx^2+Gz^2-g^2|$ of the acceleration Gx in the back and forth direction and the acceleration Gz in the up and down direction from the vector components of the gravitational acceleration g is greater than the prescribed first threshold Thr. As a result, it can correct temperature variations and aging degradation of the acceleration sensor 11.

In addition, according to the embodiment 4, the sensitivity correcting unit 15 is configured in such a manner as to send information to the inclination computing unit 4 if the difference $|Gx^2+Gz^2-g^2|$ of the vector components of the acceleration Gx in the back and forth direction and the acceleration Gz in the up and down direction from the gravitational acceleration g is greater than the second threshold Thr1 that is greater than the first threshold Thr; and the inclination computing unit 4 is configured in such a manner as to substitute the preset values θ1 (default) and θ2 (default) for one of or both of the road surface gradient θ1 and pitching angle θ2 when receiving the information from the sensitivity correcting unit 15. As a result, if the accelerations Gx and Gz output from the acceleration sensor 11 are abnormal, the embodiment 4 can output a value that can control the navigation system 13 and optical axis adjuster 14 in a fail-safe side.

Incidentally, although the inclination detector 1d shown in FIG. 13 is configured by modifying the inclination detector 1 of the embodiment 1 shown in FIG. 1 in the foregoing description, it can also be configured by modifying the inclination detector 1a or 1b of the embodiment 2 shown in FIG. 7 or FIG. 10.

In addition, although the foregoing embodiments 1-4 show the navigation system 13 as an example of an onboard apparatus using the road surface gradient θ1, and the optical axis adjuster 14 as an example of an onboard apparatus using the pitching angle θ2, it goes without saying that the inclination detectors 1 and 1a-1d can supply other onboard apparatuses with the road surface gradient θ1 and the pitching angle θ2.

Furthermore, a configuration is also possible which incorporates the inclination detector 1 or 1a-1d into an onboard apparatus such as the navigation system 13 and optical axis adjuster 14.

Incidentally, it is to be understood that a free combination of the individual embodiments, variations of any components of the individual embodiments or removal of any components of the individual embodiments is possible within the scope of the present invention.

INDUSTRIAL APPLICABILITY

As described above, an inclination detector in accordance with the present invention is configured in such a manner as to calculate the road surface gradient and the pitching angle from the acceleration in the back and forth direction and the acceleration in the up and down direction of the vehicle, and from the real acceleration in the direction of travel. Accordingly, it is suitable for application to an onboard apparatus such as a navigation system and optical axis adjuster mounted in a vehicle.

DESCRIPTION OF REFERENCE SYMBOLS

1, 1a, 1b, 1c, 1d inclination detector; 2, 7 communication I/F; 3 real acceleration computing unit; 4 inclination computing unit; 5 road surface gradient computing unit; 6 pitching angle computing unit; 8 acceleration converter; 9 acceleration sensor; 10 vehicle; 11, 11a, 11b acceleration sensor; 12 wheel speed sensor; 13 navigation system; 14 optical axis adjuster; 15 sensitivity correcting unit 15.

What is claimed is:

1. An inclination detector comprising:
an inclination computing device that calculates one of or both of a road surface gradient θ1 and a pitching angle θ2 from acceleration $G_x$ in back and forth direction and from acceleration $G_z$ in up and down direction of a vehicle and from real acceleration $G_w$ in direction of travel of the vehicle, the road surface gradient being an inclination in back and forth direction of a road surface on which the vehicle is placed, and the pitching angle θ2 being an inclination in the back and forth direction of the vehicle with respect to the road surface; and
a first communication interface that transmits, to an onboard apparatus including an optical axis adjuster installed in the vehicle, a value calculated by the inclination computing device, wherein the pitching angle θ2 as the calculated value is used for controlling an angle of light output by a light of the vehicle,
wherein the inclination computing device is configured to calculate the road surface gradient θ1 through an expression (1-2) which is derived from an expression (1-1) by linearly approximating $\sin^{-1}$ in the expression (1-1), where g is gravitational acceleration and γ is a predetermined coefficient, $$\theta 1 = \sin^{-1}\{(-Gx^2-Gz^2+Gw^2+g^2)/2Gwg\} \quad (1\text{-}1)$$

$$\theta 1 = \gamma(-Gx^2-Gz^2+Gw^2+g^2)/2Gw\,g \quad (1\text{-}2)$$

calculate the pitching angle θ2 through an expression (2-2) which is derived from an expression (2-1) by linearly approximating $\tan^{-1}$ and $\sin^{-1}$ in the expression (2-1), where α and β are predetermined coefficients, and $$\theta 2 = \tan^{-1}(Gx/Gz) + \sin^{-1}\{(Gx^2+Gz^2+Gw^2-g^2)/2Gw/\text{sqrt}(Gx^2+Gz^2)\} \quad (2\text{-}1)$$

$$\theta 2 = \alpha(Gx/Gz) + \beta\{(Gx^2+Gz^2+Gw^2-g^2)/2Gw/\text{sqrt}(Gx^2+Gz^2)\} \quad (2\text{-}2)$$

obtain in advance the coefficients α, β, and γ to be applied to the expressions (1-2) and (2-2).

2. The inclination detector according to claim 1, further comprising:
a second communication interface that acquires velocity in the direction of travel from a wheel speed sensor installed in the vehicle; and
a real acceleration computing device that calculates the real acceleration in the direction of travel by differentiating the velocity acquired via the second communication interface.

3. The inclination detector according to claim 1, further comprising:
- a second communication interface that acquires acceleration in any two-axis directions from a two-axis acceleration sensor installed in the vehicle, the two-axis acceleration sensor being installed in a state in which at least one axis has a tilt with respect to a horizontal plane passing through the back and forth direction and right and left direction of the vehicle and with respect to a vertical plane passing through the right and left direction and up and down direction of the vehicle; and
- an acceleration converter that converts accelerations in the any two-axis directions acquired via the second communication interface to acceleration in the back and forth direction and to acceleration in the up and down direction by using mounting information of the two-axis acceleration sensor.

4. The inclination detector according to claim 1, further comprising:
- a second communication interface that acquires acceleration in the back and forth direction and acceleration in the up and down direction from a two-axis acceleration sensor which is installed in the vehicle in a state in which a first axis is parallel to the back and forth direction of the vehicle, and a second axis is parallel to the up and down direction of the vehicle.

5. The inclination detector according to claim 1, further comprising:
- a two-axis acceleration sensor that is installed in the vehicle in a state in which a first axis is parallel to the back and forth direction of the vehicle and a second axis is parallel to the up and down direction of the vehicle, and that detects acceleration in the back and forth direction and acceleration in the up and down direction.

6. The inclination detector according to claim 1, wherein the inclination computing device is configured to
determine whether the vehicle is running or stopped on a basis of a velocity acquired by a wheel speed sensor installed in the vehicle,
calculate the road surface gradient $\theta 1$ and the pitching angle $\theta 2$ through the expressions (1-2) and (2-2) when it is determined that the vehicle is running, and
when it is determined that the vehicle is stopped, hold the road surface gradient $\theta 1$, which has been calculated in a condition where the vehicle is running, and calculate the pitching angle $\theta 2$ by calculating or approximately calculating the following two expressions using the road surface gradient $\theta 1$ having been held and the acceleration Gx or the acceleration Gz, $$Gx = -g \sin(\theta 1 + \theta 2) \text{ or } Gz = -g \cos(\theta 1 + \theta 2)$$

where g is gravitational acceleration.

7. The inclination detector according to claim 3, further comprising:
- a sensitivity correcting device that corrects, while the vehicle is stopped and when difference between the gravitational acceleration and components of a vector of the acceleration in the back and forth direction and of a vector of the acceleration in the up and down direction is greater than a prescribed first threshold, sensitivity of the two-axis acceleration sensor in accordance with the individual accelerations and the gravitational acceleration.

8. The inclination detector according to claim 7, wherein
the sensitivity correcting device sends information to the inclination computing unit if the difference between the gravitational acceleration and the components of the vector of the acceleration in the back and forth direction and of the vector of the acceleration in the up and down direction is greater than a prescribed second threshold that is greater than the first threshold; and
the inclination computing device substitutes a preset value for one of or both of the road surface gradient and the pitching angle when receiving the information from the sensitivity correcting device.

\* \* \* \* \*